(12) United States Patent
Patrizi et al.

(10) Patent No.: US 7,426,771 B2
(45) Date of Patent: Sep. 23, 2008

(54) CHILD RESISTANT ASSEMBLY FOR CHILD VEHICLE SEAT

(75) Inventors: Timothy Patrizi, Reading, PA (US); Patrick B. Nolan, Royersford, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

(21) Appl. No.: 11/820,599

(22) Filed: Jun. 20, 2007

(65) Prior Publication Data

US 2007/0245527 A1 Oct. 25, 2007

Related U.S. Application Data

(62) Division of application No. 10/822,862, filed on Apr. 13, 2004, now Pat. No. 7,252,342.

(51) Int. Cl.
- A44B 11/25 (2006.01)
- A44B 11/26 (2006.01)
- A44B 21/00 (2006.01)

(52) U.S. Cl. .............................. 24/307; 24/614; 24/629

(58) Field of Classification Search .................. 24/614, 24/615, 307, 633, 629, 581.1, 579.11
See application file for complete search history.

(56) References Cited

U.S. PATENT DOCUMENTS

| | | | |
|---|---|---|---|
| 4,569,106 A * | 2/1986 | Lovato | 24/615 |
| 5,286,090 A | 2/1994 | Templin et al. | |
| 5,380,066 A | 1/1995 | Wiseman et al. | |
| 5,570,932 A | 11/1996 | Collins et al. | |
| 5,953,798 A * | 9/1999 | Matoba et al. | 24/615 |
| 6,260,925 B1 | 7/2001 | Miller | |
| 6,662,413 B2 * | 12/2003 | Glover | 24/615 |
| 2002/0029443 A1 * | 3/2002 | Ortiz | 24/615 |
| 2003/0121129 A1 * | 7/2003 | Hamilton | 24/615 |

FOREIGN PATENT DOCUMENTS

| | | |
|---|---|---|
| EP | 0 295 838 A1 | 12/1988 |
| WO | WO 2005/000063 A1 | 1/2005 |

OTHER PUBLICATIONS

Collection of 8 phtographs of child vehicle seat restraint buckles, harness and latches.

(Continued)

*Primary Examiner*—Robert J Sandy
(74) *Attorney, Agent, or Firm*—Lempia Braidwood LLC

(57) ABSTRACT

A child restraint assembly for a child vehicle seat includes a buckle assembly including a buckle and a pair of latches, a harness coupled to the buckle assembly, and a harness adjuster to adjust the harness. The child restraint assembly also can include a chest clip coupled to the harness. The chest clip can include a male member and a female member releasably coupled to the male member. The male member can have a pair of opposing grip surfaces of sufficient thickness to enable a user to grip the male member when decoupling the male member and the female member. The chest clip can also have a finger grip configured to grip and move the chest clip to a desired location along the harness.

18 Claims, 10 Drawing Sheets

OTHER PUBLICATIONS

Photograph of Peg-Perego child vehicle seat restraint buckle, harness and latches.

Photographs of 3 Britax child vehicle seat restraint buckles, harness and latches.

Photographs of 2 Cosco child vehicle seat restraint buckles, harness, and latches.

Photograph of Evenflo child vehicle seat restraint buckle, harness and latches.

Photographs of 2 Graco child vehicle seat restraint buckles, harness and latches.

Photograph of Baby Trend child vehicle seat restraint buckles, harness and latches.

Kendrion child vehicle seat restraint product literature; www.holmbergs.se/Holmbergs/Products/ChildSafety/ChildSafetyBody; Jul. 19, 2005.

Sabelt child vehicle seat restraint buckle; www.sabelt.com/home/infanzia.jpg.; Jul. 19, 2005.

* cited by examiner

CHILD RESISTANT ASSEMBLY FOR CHILD VEHICLE SEAT

This application is a divisional application of U.S. patent application Ser. No. 10/822,862, filed on Apr. 13, 2004, the disclosure of which is hereby incorporated by reference as if set forth in its entirety herein.

BACKGROUND OF THE INVENTION

1. Field of the Invention

This invention relates to a child restraint assembly for a child vehicle seat. More specifically, this invention relates to a child restraint assembly that is efficient and intuitive to operate.

2. Background of the Invention

Child restraint assemblies for child vehicle seats typically include a chest clip positionable at the child's armpit level, a buckle assembly positionable between the child's thighs, a harness adjuster positioned at a front, lower edge of the vehicle seat, and straps of webbing to secure the child in place in the vehicle seat. Shoulder straps are threaded through the chest clip and are coupled to latches of the buckle assembly. Waist straps, which can be integral with or separate from the shoulder straps, also are coupled to the latches of the buckle assembly. A short strap attaches the buckle of the buckle assembly to the vehicle seat shell. Finally, a long, adjustment strap is connected to the shoulder and waist straps behind the rear surface of the vehicle seat and then extends through the harness adjuster to the front of the vehicle seat, where it can be pulled to tighten the shoulder and waist straps. These assemblies can be present in infant carrier vehicle seats, in convertible vehicle seats for older children, and in harness booster seats.

Chest clips and buckle assemblies on the market today require a user to grasp them from behind to operate them. Accordingly, it is difficult to open, close, and adjust the chest clips and buckle assemblies while a child is in the vehicle seat because the user must pass his fingers between the back surface of the clip or buckle and the front of the child. Gripping the clip or the buckle assembly in this manner can be uncomfortable for the child, as well as awkward for the user.

In addition, new parents and caregivers have many new responsibilities and tasks to learn with the arrival of a child, such as how to operate play pens, swings, bouncy seats, toys, and, of course, child vehicle seats. As for the last of these, children must be installed properly and securely in the vehicle seat for their safety. At times, hassled parents and caregivers may become confused about how to secure the child restraint assembly properly. Further, the controls for the child restraint assemblies on different vehicle seats look and operate differently, adding to the users' confusion and the potential misuse of those assemblies.

Thus, there is a need for a child restraint assembly that is simple to use and understand.

SUMMARY OF THE INVENTION

In accordance with one aspect of the present invention, a chest clip of a child restraint assembly for a child vehicle seat is provided. The chest clip includes a first engagement member including a body presenting a side surface. A second engagement member includes a body presenting a side surface. The first and second engagement members are adapted to releasably engage each other and the side surfaces of the first and second engagement members face each other when the engagement members are engaged. A finger grip is carried by one of the engagement members and spans across the side surfaces of the first and second engagement members when the first and second engagement members are engaged.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description; serve to explain the principles of the invention.

DETAILED DESCRIPTION OF THE PREFERRED EMBODIMENTS

Reference will now be made in detail to presently preferred embodiments of the invention, examples of which are illustrated in the accompanying drawings. An effort has been made to use the same reference numbers throughout the drawings to refer to the same or like parts.

Figure 1:
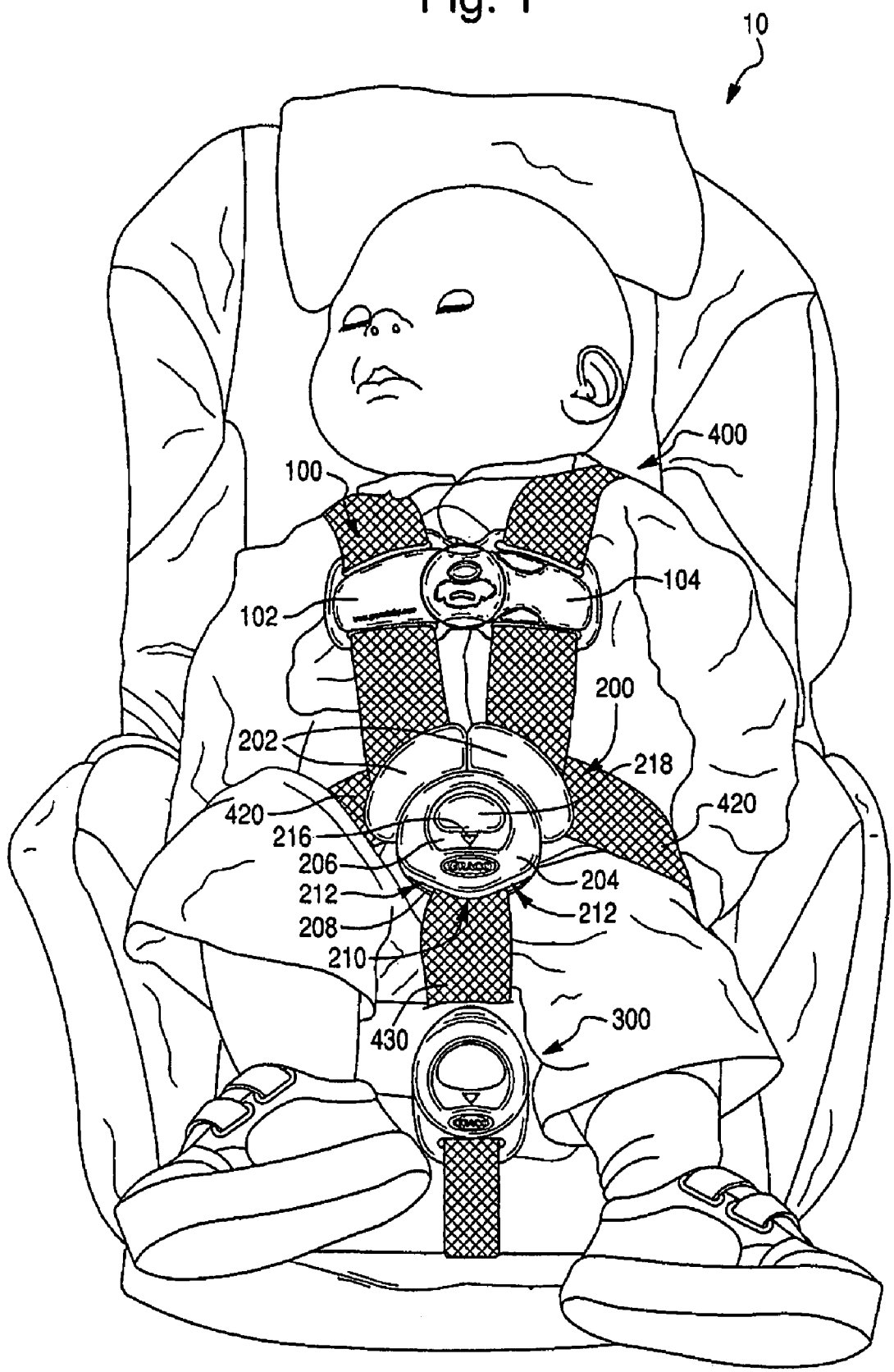
FIG. 1 is a front perspective view of a child vehicle seat that employs a child restraint assembly in accordance with the invention.

FIG. 1 illustrates a child seat 10 that employs a child restraint assembly in accordance with the invention. The child restraint assembly generally includes a chest clip 100, a buckle assembly 200, a harness adjuster 300, and a harness 400 that is threaded through the chest clip 100 and the buckle assembly 200 and that is adjustable via the harness adjuster 300.

The chest clip 100 and the buckle assembly 200 are configured so that a user can easily unlatch the chest clip 100 and buckle assembly 200 by contacting only the front and/or grip surfaces of these components to unlatch them. The grip surfaces can comprise part of the front surfaces of these components, or they can comprise side surfaces of the components. Also, the chest clip 100 can be adjusted up or down, to a proper position between a child's armpits, by only gripping the front and/or finger grips of the chest clip 100. The finger grips of the chest clip can be formed on the front surface of the chest clip. Because the user need not contact the rear surfaces of the chest clip 100 or the buckle assembly 200, he can avoid inserting his fingers between these components and a child sitting in the vehicle seat. Accordingly, manipulation of the chest clip 100 and the buckle assembly 200 is more comfortable for the child and less awkward for the user. Similarly, the harness adjuster 300 is configured so that a user can actuate the adjuster 300 to adjust the harness by contacting only the front and/or grip surfaces of the adjuster 300. The grip surfaces of the adjuster 300 can comprise part of the front surface of the adjuster 300, or they can comprise side surfaces of the adjuster 300.

In addition, the buckle assembly 200 and the harness adjuster 300 are provided with a common user interface and move in the same general direction during actuation so that operation of the components is user friendly, instructional, and intuitive. The chest clip 100, the buckle assembly 200, and the harness adjuster 300 are provided with visible user cues, for example, graphics, parts shapes, and/or instructional icons, to direct proper assembly and usage.

Figure 2:
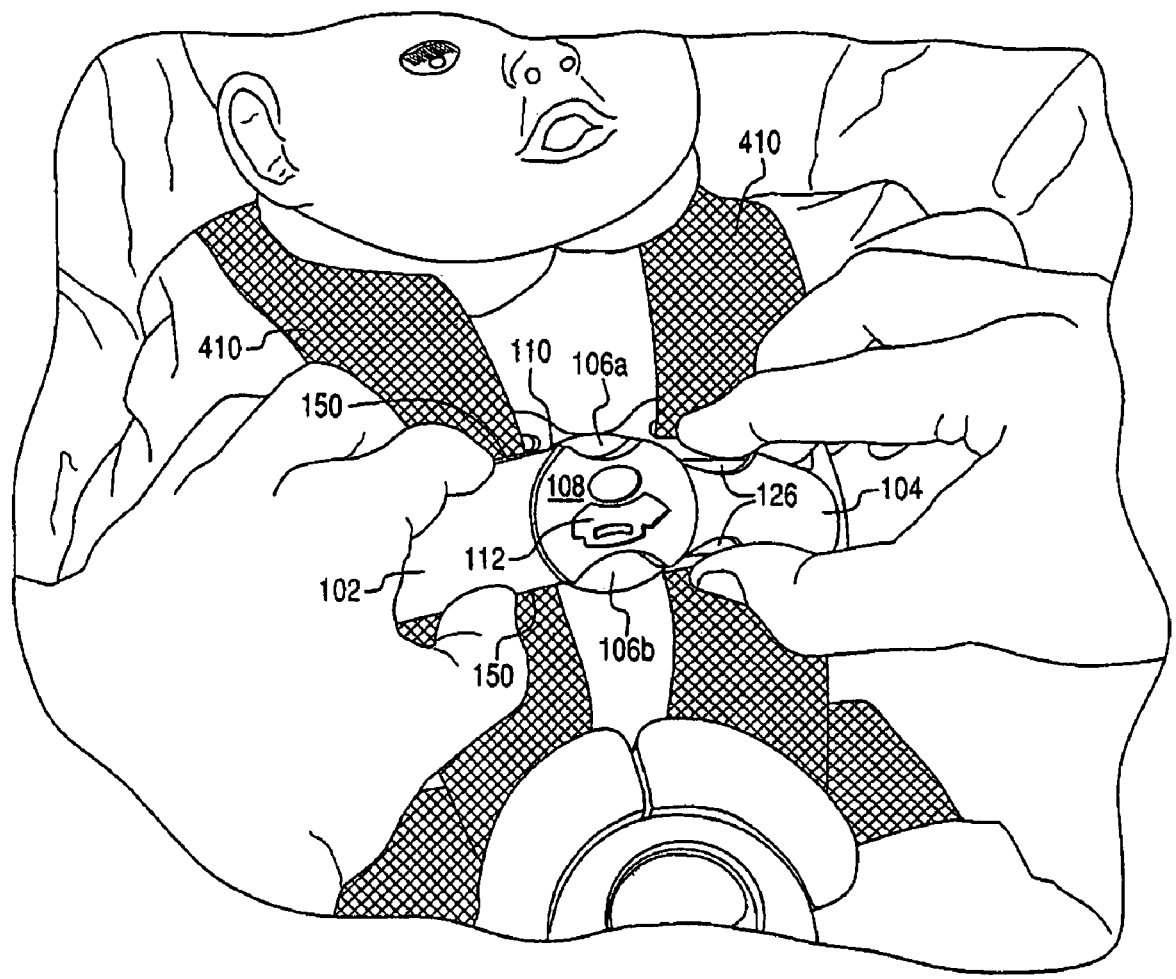
FIG. 2 is a front perspective view of a chest clip of the child restraint assembly and shows a user unlatching the chest clip from the front of the chest clip
Figure 3:
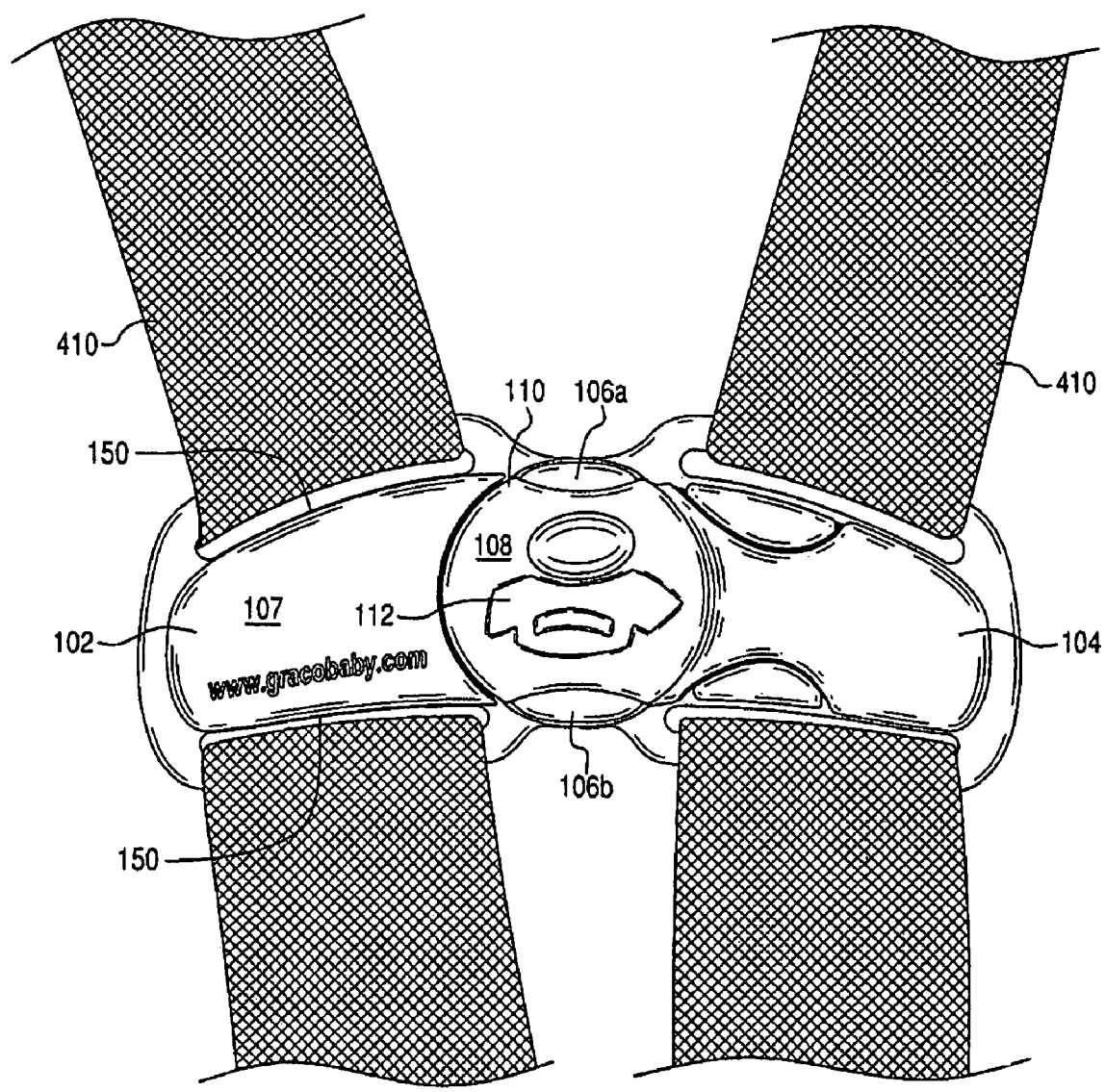
FIG. 3 is a front perspective view of the chest clip.

FIGS. 1-3, 8, and 10 illustrate an embodiment of chest clip 100 in accordance with the invention. The chest clip 100 generally includes a male member 102 and a female member 104. The male and female members 102, 104 are adapted to matingly engage to lock the chest clip 100 in front of a child seated in the vehicle seat 10. The female member 104 includes a pair of opposing finger grips 106a, 106b to enable a user to grip the front surface 108 and position the chest clip 100 at a proper location relative to a child seated in the vehicle seat 10. The finger grips 106a, 106b can be depressions formed at opposing edges of the front surface 108 of the chest clip 100, as shown in FIG. 3. Alternatively, opposing finger grips can be provided by protuberances on the front surface 108 of the female member 104. In other alternative embodiments, the finger grips can be provided by depressions or protuberances on the front surface of the male member 102 or by depressions or protuberances on side surfaces of the female or male members 102, 104.

The female member 104 has a raised portion 110 that is centrally located on the chest clip 100 when the male and female members 102, 104 are engaged, as seen in FIG. 2. The raised portion 110 and finger grips 106a, 106b form a generally circular, medallion-like piece at the center of the engaged chest clip 100. One of the finger grips 106a can be located at an upper edge of the raised portion 110, and the other of the finger grips 106b can be located at the lower edge of the raised portion 110. The finger grips 106a, 106b are designed to provide grips for a user's thumb and forefinger so that the user can slide the chest clip 100 along the shoulder straps 410 of the harness 400 to its proper position relative to the child's armpits.

An instructional icon 112 can be printed on the front surface of the raised portion 110 to visually cue a user that the chest clip 100 should be positioned between the armpits of the child. The instructional icon 112 can be printed on the chest clip 100 by embossing, engraving, painting, stamping, or any other conventional printing method. The instructional icon 112 is strategically located on the raised portion 110 so that it can be seen when the user grips the finger grips 106a, 106b to adjust the chest clip 100.

In addition to instructional icon 112, the chest clip 100 can include company web site information printed on a front surface 107, 108 of either the male or female member 102, 104. FIG. 3 shows the company web site engraved on the front surface of the male member 102. Like the instructional icon 112, the web site information can be printed on the chest clip 100 by embossing, engraving, painting, stamping, or any other conventional printing method. The web site information serves as an reminder to a user of where the user can look for additional product information.

Figure 8:
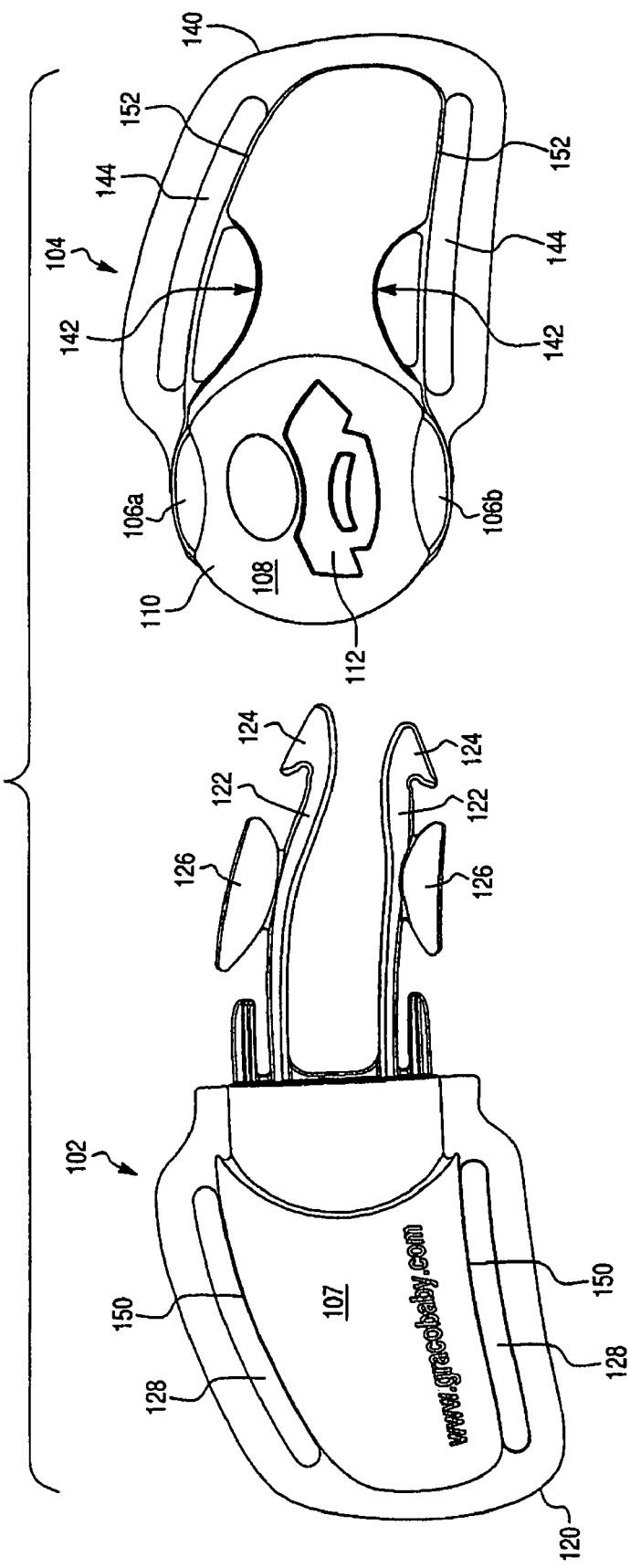
FIG. 8 is a top plan, exploded view of the male member and the female member of the chest clip in an unlatched state.

FIG. 8 illustrates an exploded view of the chest clip 100. The male member 102 generally includes a main body 120, a pair of extension arms 122 that each terminate in a tang 124, a release actuator 126 on each arm 122, and slots 128 through which a respective shoulder strap of the harness can be threaded. The female member 104 generally includes a main body 140, a socket (not shown) through the main body 140 for receipt of the arms 122 of the male member 102, the finger grips 106a, 106b and the raised portion 110, openings 142 for receipt of the release actuators 126, and slots 144 through which a respective shoulder strap of the harness can be threaded. The male and female members 102, 104 are shaped to communicate to a user that the two members interlock.

Figure 10:
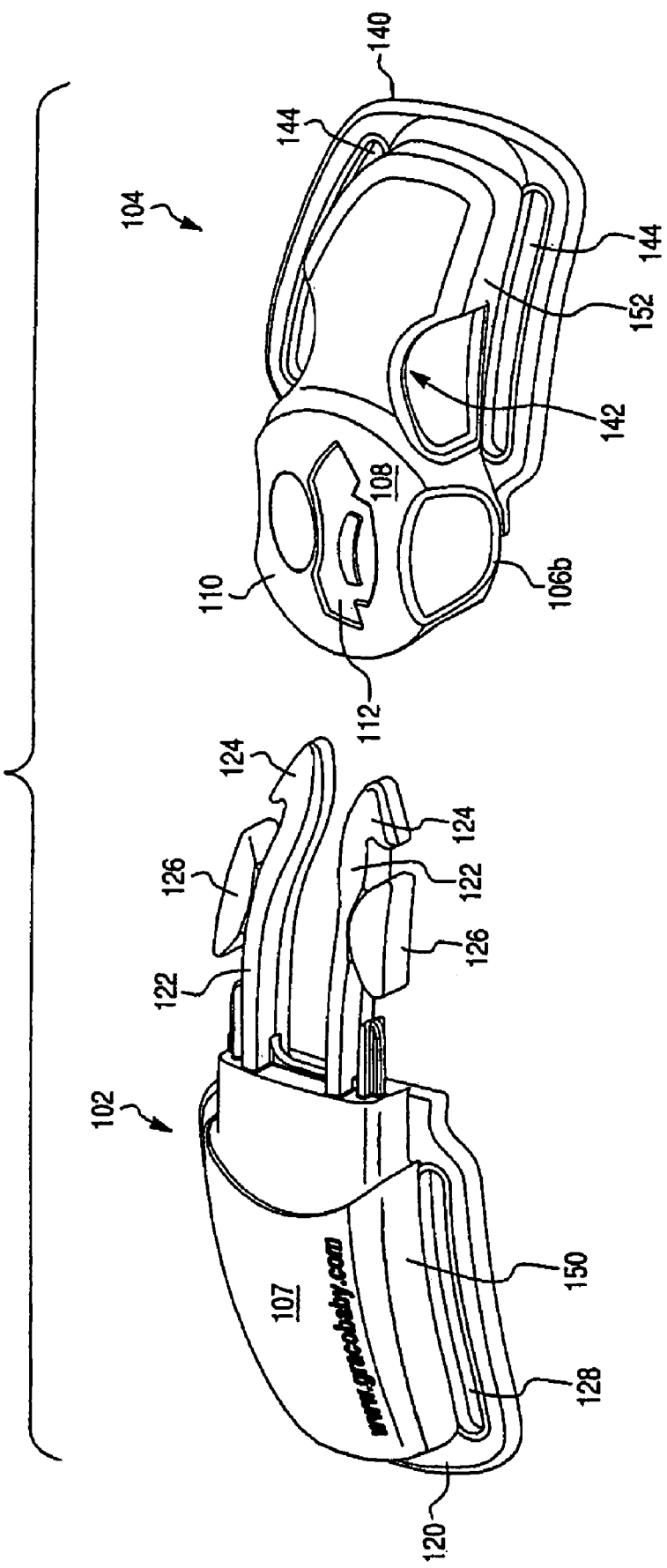
FIG. 10 is a perspective, exploded view of the male member and the female member of the chest clip in an unlatched state.

The male member 102 also includes opposing grip surfaces 150 of sufficient thickness to enable a user to grip the male member, while actuating the release actuators 126, to decouple the male and female members 102, 104 as shown in FIGS. 2 and 10. The grip surfaces 150 can comprise side surfaces of the male member 102. In the illustrated embodiment, the grip surfaces 150 extend from the top of the respective slots 128 toward the front surface 107 of the male member. As seen in FIG. 10, a curved portion connects each grip surface 150 of this embodiment to the front surface 107; however, in other embodiments, the grip surfaces 150 may merge directly into the front surface 107. The grip surfaces 150 can have a thickness or depth of at least 3/8 of an inch. The presence of grip surfaces 150 means that the chest clip 100 can be latched and unlatched by a user without insertion of the user's fingers between the rear of the chest clip 100 and the child. The user also can grip opposing grip surfaces 152 on the female member 102 if necessary to facilitate adjustment or decoupling of the chest clip 100.

Figure 4:
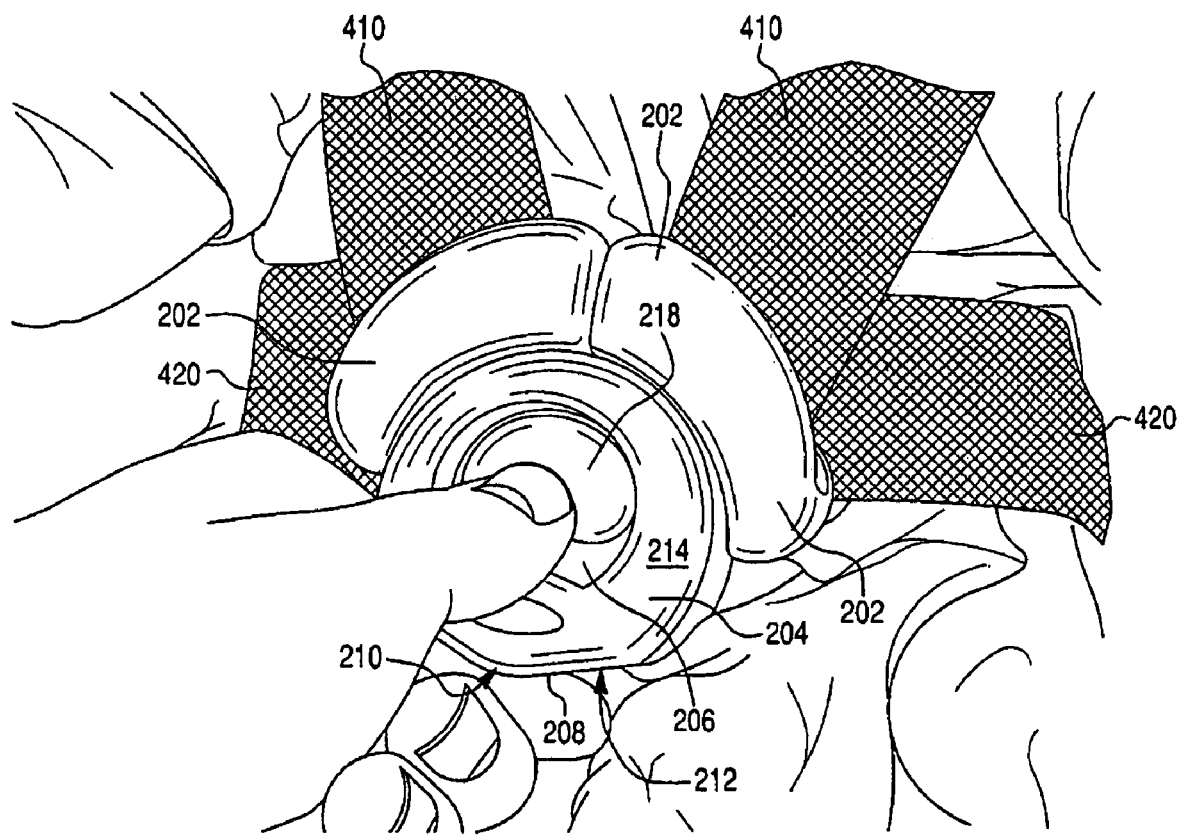
FIG. 4 is a is a front perspective view of a buckle assembly of the child restraint assembly and shows a user unlatching the buckle assembly from the front of the buckle assembly.

FIGS. 1 and 4 illustrate an embodiment of buckle assembly 200 in accordance with the invention. The buckle assembly 200 includes a buckle 204 and at least one latch, and, in the illustrated embodiment, a pair of latches 202. The buckle 204 is adapted to releasably engage the pair of latches 202. The shoulder straps 410 of the harness 400 are coupled to the latches 202. Waist straps 420 also are coupled to the latches 202, and these waist straps 420 can be integral with the shoulder straps 410, as shown in FIGS. 1 and 4, or separate from the shoulder straps 410. The buckle 204 is coupled to the vehicle seat shell via a short strap of webbing 430, as shown in FIG. 1.

The buckle 204 includes a buckle actuator 206 that is movable between a first position, as shown in FIG. 1, and a second position to unlock the latches 202 from the buckle 204. FIG. 4 shows a user slidably moving the buckle actuator 206 from the first position toward the second position. The buckle also includes a grip surface 208 of sufficient thickness to enable a user to brace a finger against the buckle grip surface 208 when actuating the buckle actuator 206. As shown in FIG. 4, the user can brace the knuckle of a forefinger against the grip surface 208 and, using his thumb, slide the buckle actuator 206 from the first position to the second position. In this manner, the user need not insert his fingers between the buckle 204 and the child. The grip surface 208 can be a lower, side surface of the buckle 204 and can be contoured. The grip surface 208 can include a medial portion 210 flanked by two angled portions 212, in a "chin" shape, so that either a left-handed or right-handed user can easily actuate the buckle actuator 206. As can be seen from FIG. 4, the buckle actuator 206 slides toward the contoured grip surface 208 when moved from the first position to the second position.

The buckle 204 includes a front surface 214 having a recessed area (obscured by the buckle actuator 206), and the buckle actuator 206 is located in the recessed area. The recessed area can include an aperture through which the buckle actuator 206 extends. An internal buckle latching mechanism and corresponding latches suitable for use with the invention are manufactured by AMSAFE.

The buckle actuator 206 can include a directional icon 216 to indicate the direction of movement of the buckle actuator 206 from the first position to the second position. The directional icon 216 of this embodiment is an arrow, although other directional icons can be envisioned. The directional icon 216 allows users to intuit how to unlock the buckle assembly 200.

The buckle actuator 206 can include a tactile pad 218 to prevent a user's thumb from slipping off of the actuator 206 when unlocking the buckle assembly 200. The pad 218 can be formed of a soft plastic material molded or adhered to the harder plastic material of the remaining part of the actuator 206. The pad 218 can be colored differently from the remaining part of the actuator 206 and from the buckle 204 so that the button actuator 206 is visually distinct; for example, the pad 218 can be red and the remaining part of the actuator 206 and the buckle 204 can be grey. The buckle actuator 206 can have a hemispherical or padlock shape to suggest proper thumb placement to a user.

In addition, the buckle 204 can have rounded edges so that the buckle 204 does not pinch the child or otherwise cause discomfort to the child. The angled portions 212 of the contoured grip surface 208 also serve to minimize pinching or rubbing of the buckle 204 against the child's thighs, as can be understood from in FIG. 1.

Figure 5:
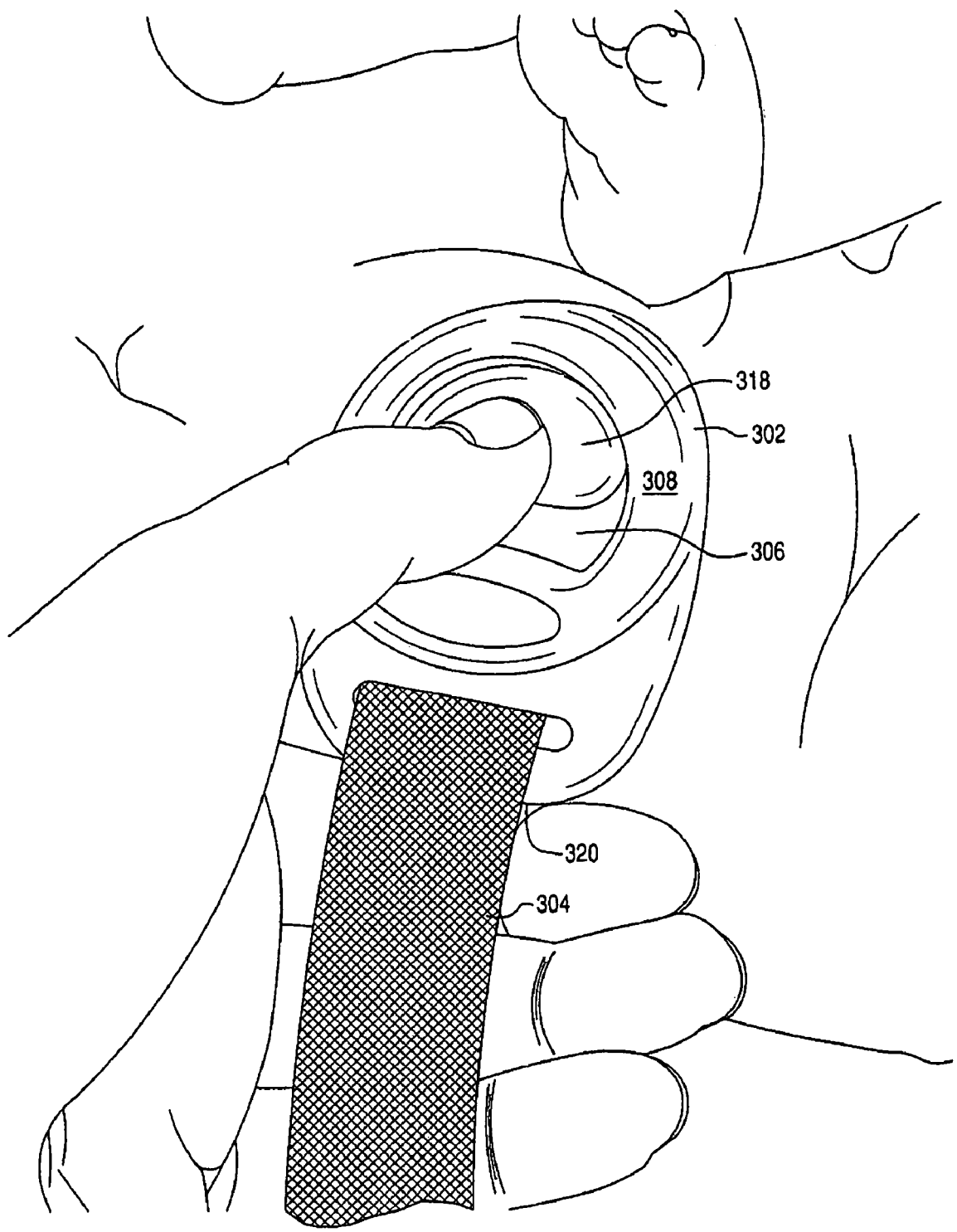
FIG. 5 is a front perspective view of a harness adjuster of the child restraint assembly and shows a user actuating the harness adjuster to adjust the tightness of the harness.
Figure 6:
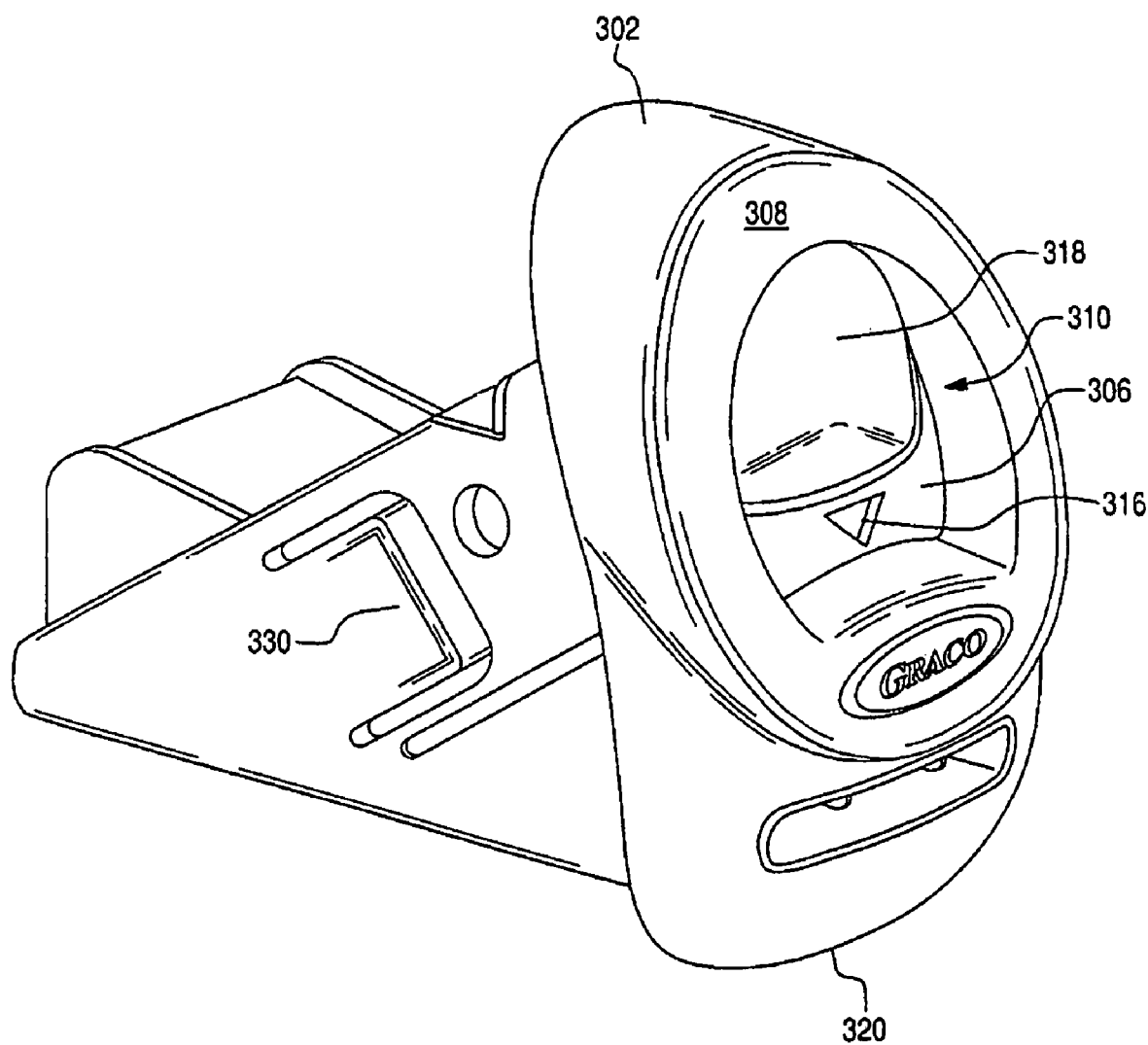
FIG. 6 is a perspective view of the harness adjuster.

FIGS. 1 and 5-7 illustrate an embodiment of the harness adjuster 300, which is used to adjust the tightness of the harness of the child restraint assembly. The harness adjuster 300 includes a housing 302, through which a harness adjuster strap 304 extends, and a harness adjuster actuator 306. The harness adjuster actuator 306 is movable between a first position, as shown in FIG. 1, to a second position relative to a front surface 308 of the housing 302 to unlock the harness adjuster and allow adjustment of the harness. FIG. 5 shows a user moving the harness adjuster actuator 306 from the first position toward the second position. Movement of the harness adjuster actuator 306 from the first position to the second position occurs in the same direction as movement of the buckle actuator 206 from the first position to the second position. Because the harness adjuster actuator 306 and the buckle actuator 206 have generally the same signature geometry and actuation operation, a user has a very small learning curve to understand how to operate the child restraint assembly properly.

Figure 7:
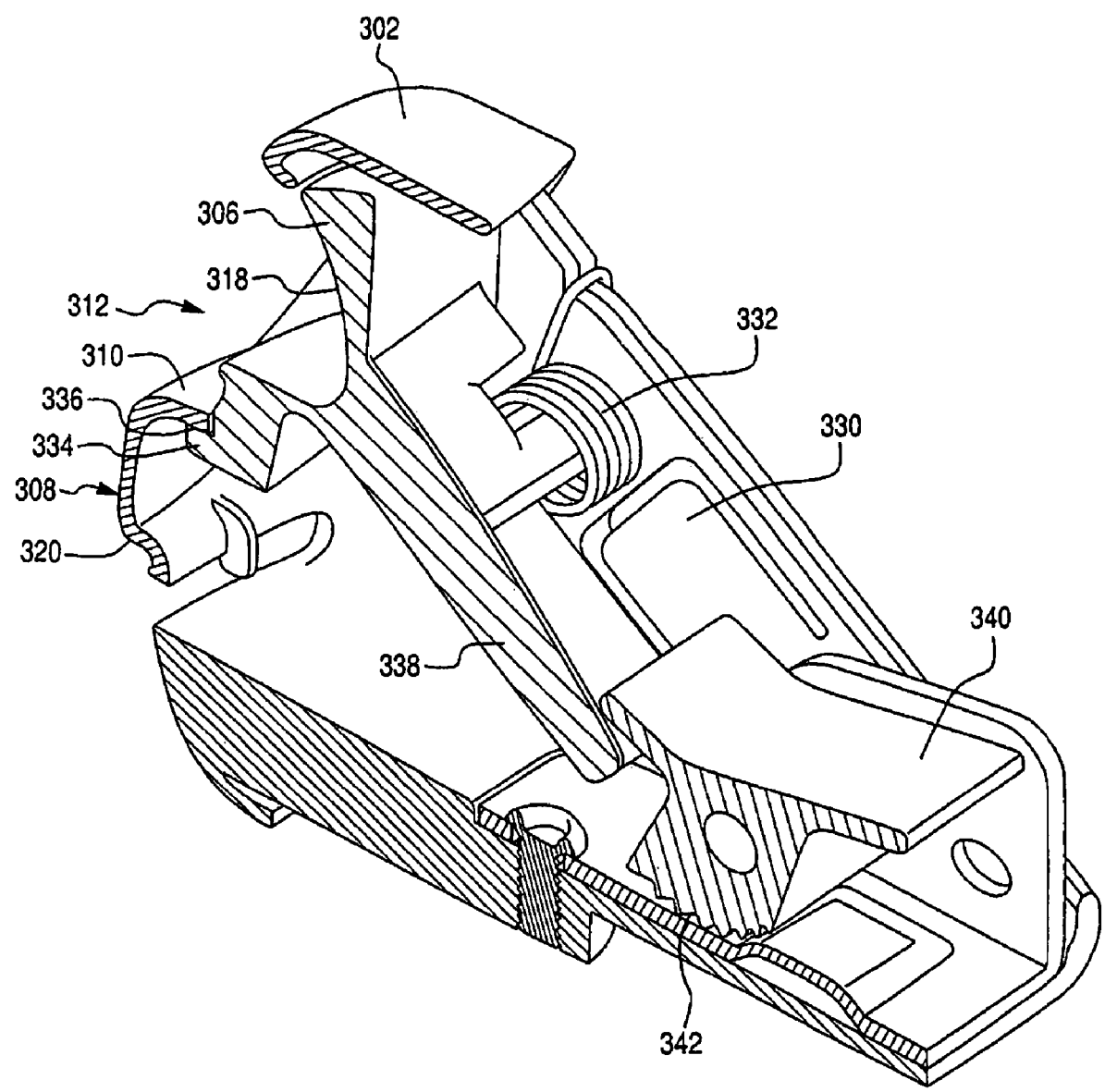
FIG. 7 is a partial cross sectional view of the harness adjuster.

The front surface 308 of the housing 302 has a recessed area 310, as shown in FIG. 7, and the harness adjuster actuator 306 is mounted within the recessed area 310. The recessed area 310, includes an aperture 312 through which the harness adjuster actuator 306 extends. The recessed area 310 of the harness adjuster housing 302 is sufficiently recessed from the front surface 308 of the housing 302 to ensure that a child cannot inadvertently actuate the harness adjuster actuator 306 by swinging its feet.

The harness adjuster actuator 306 includes a directional icon 316 to indicate the direction of movement of the harness adjuster actuator 306 from the first position to the second position. The directional icon 316 of this embodiment is an arrow, although other directional icons can be envisioned. The directional icon 316 allows users to intuit how to unlock the harness adjuster 300.

Like the buckle actuator 206, the harness adjuster actuator 306 can include a tactile pad 318 to provide a soft feel and to prevent a user's thumb from slipping off of the actuator 306 when unlocking the harness adjuster 300. The pad 318 can be colored differently from the remaining part of the harness adjuster actuator 306; for example, the pad 318 can be yellow and remaining part of the actuator 306 can be grey. The actuator 306 can have a hemispherical or padlock shape to suggest proper thumb placement to a user.

The housing 302 of the harness adjuster 300 can have rounded edges to minimize abrasive contact with the child's legs. The housing 302 also can include a grip surface 320 of sufficient thickness to provide a grip against which a user can brace a finger. The grip surface 320 can be a lower, side surface of the housing 302, as shown in FIGS. 5 and 7. As can be seen from FIG. 5, the configuration of the harness adjuster 300 enables the user to position his hand in the same position to either actuate the actuator 306 to loosen the harness 400 or to grip and pull the strap 304 to tighten the harness 400. Accordingly, this configuration is a motion-efficient design.

Figure 9:
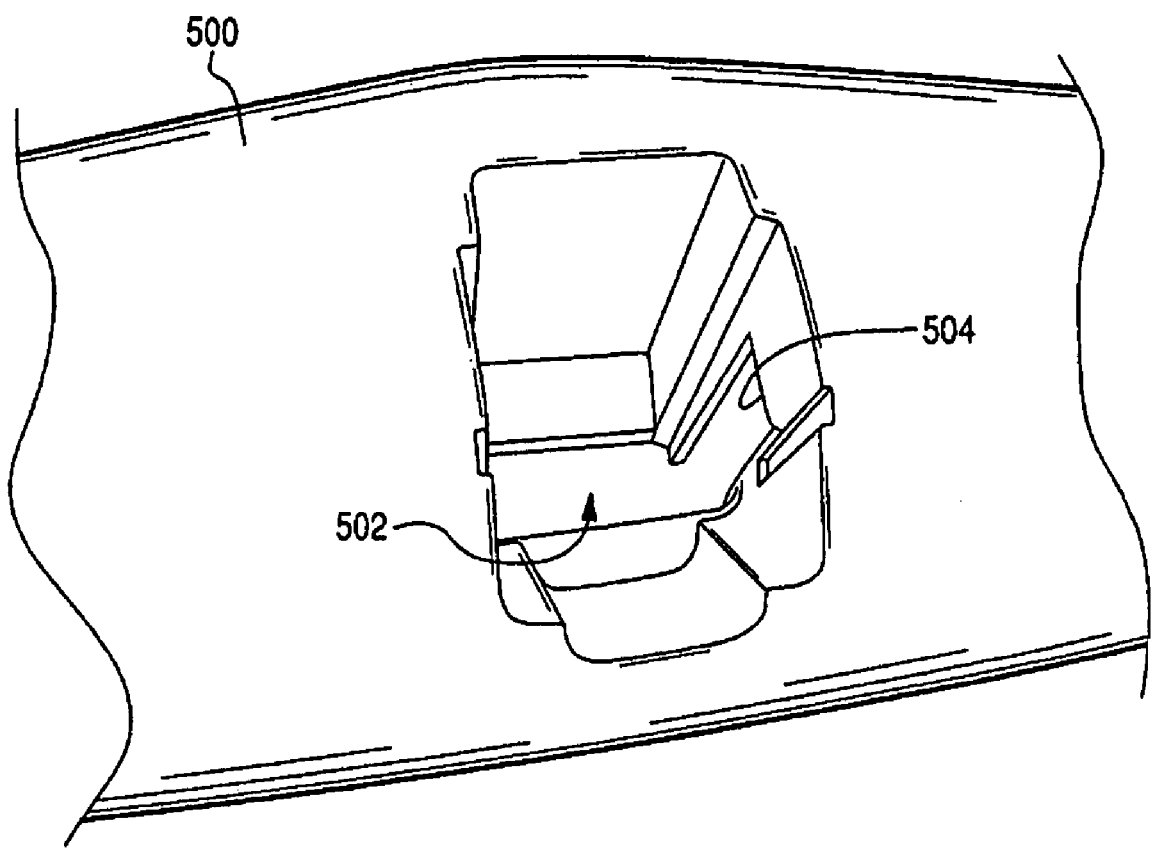
FIG. 9 is a front perspective view of a portion of the vehicle seat shell and shows a pocket into which the harness adjuster can be mounted.

Referring to FIGS. 7 and 9, the harness adjuster 300 is configured to slide into place in a snap-fit in a pocket 502 formed in the vehicle seat shell 500. The housing 302 has side flaps 330 that latch behind shoulders 504 in the pocket 502.

FIG. 7 illustrates a sectional view of the harness adjuster 300. The harness adjuster actuator 306 normally is biased to the first position by a spring 332, where a lower lip 334 of the actuator 306 seats against a shoulder 336 of the housing 302. As can be seen from FIG. 8, when a user actuates the harness adjuster actuator 306, the actuator 306 pivots, and a tail 338 of the actuator 306 pushes up against a lock device 340 to move a toothed surface 342 of the lock device 340 away from strap 304 (not shown in FIG. 7). One suitable lock device 340 is manufactured by Indiana Mills & Manufacturing Inc.

The preferred embodiments have been set forth herein for the purpose of illustration. This description, however, should not be deemed to be a limitation on the scope of the invention. Various modifications, adaptations, and alternatives may occur to one skilled in the art without departing from the claimed inventive concept. The true scope and spirit of the invention are indicated by the following claims.

What is claimed is:

1. A chest clip of a child restraint assembly for a child vehicle seat, the chest clip comprising:
    a first engagement member including a body presenting a side surface;
    a second engagement member including a body presenting a side surface, wherein the first and second engagement members are adapted to releasably engage each other and the side surfaces of the first and second engagement members face each other when the engagement members are engaged; and
    a finger grip carried by one of the engagement members and configured for gripping to move the chest clip along the shoulder harness to a desired location relative to a child seated in the child vehicle seat, the finger grip spanning across the side surfaces of the first and second engagement members when the first and second engagement members are engaged, the one engagement member having a front surface facing away from the child vehicle seat, wherein the finger grip comprises a protuberance disposed on the front surface of the one engagement member.

2. The chest clip as recited in claim 1, wherein the finger grip comprises a depression formed in an upward facing surface of the protuberance.

3. The chest clip as recited in claim 1, wherein the finger grip comprises a concavity formed in a downward facing surface of the protuberance.

4. The chest clip as recited in claim 1, wherein the protuberance defines an upward-facing surface and a downward-facing surface and the finger grip is on the downward facing surface, the chest clip further comprising a second finger grip on the upward facing surface.

5. The chest clip as recited in claim 1, wherein the finger grip comprises a depression on an upward facing surface of the protuberance and another depression on a downward facing surface of the protuberance.

6. A chest clip of a child restraint assembly for a child vehicle seat, the chest clip comprising:
   a first engagement member;
   a second engagement member, wherein the first and second engagement members are adapted to releasably engage each other, and each engagement member includes a body defining an inner side surface such that the side surfaces of each engagement member face each other when the engagement members are engaged;
   a release actuator positioned on the chest clip and configured to disengage the engagement members; and
   a finger grip carried on one of the engagement member bodies and configured for gripping to move the chest clip along the shoulder harness to a desired location relative to a child seated in the child vehicle seat, wherein gripping the finger grip and moving the chest clip does not disengage the engagement members.

7. The chest clip as recited in claim 6, wherein the finger grip comprises a depression formed in the one engagement member body.

8. The chest clip as recited in claim 6, wherein each engagement member defines an upward-facing surface and a downward-facing surface, and the finger grip is carried by the downward facing surface, the chest clip further comprising a second finger grip carried by the upward-facing surface.

9. The chest clip as recited in claim 6, wherein each body defines a rear surface facing the child vehicle seat and a front surface facing away from the child vehicle seat, and the finger grip comprises a protuberance disposed on the front surface of the engagement member body that carries the finger grip.

10. The chest clip as recited in claim 6, wherein one of the bodies of the engagement members comprises a rear surface facing the child vehicle seat and a front surface facing away from the child vehicle seat, and a raised portion carded by the front surface of the body, the raised portion defining the depression.

11. The chest clip as recited in claim 6, wherein the release actuator is positioned remotely from the finger grip on the chest clip.

12. A chest clip of a child restraint assembly for a child vehicle seat, the chest clip comprising:
    a first engagement member defining at least one opening operable to receive a shoulder harness and having a rear surface facing the child vehicle seat and a front surface facing away from the child vehicle seat;
    a second engagement member defining at least one opening operable to receive a shoulder harness, wherein the first and second engagement members are adapted to releasably engage each other;
    a raised portion carried on the front surface of the first engagement member and defining an upwardly-facing surface and a downwardly-facing surface; and
    a finger grip configured for engagement to move the chest clip along the shoulder harness to a desired location relative to a child seated in the child vehicle seat, wherein the finger grip comprises a depression formed in each of the downwardly-facing and upwardly-facing surfaces of the raised portion, the depressions at least partially disposed between the openings of the first and second engagement members when the engagement members are engaged.

13. The chest clip as recited in claim 12, wherein the depressions are contained between the openings of the first and second engagement members when the engagement members are engaged.

14. The chest clip as recited in claim 12, wherein the engagement members define corresponding side surfaces that face each other when the engagement members are engaged, and the depressions span across the side surfaces when the engagement members are engaged.

15. The chest clip as recited in claim 14, wherein the depressions are continuous across the side surfaces.

16. The chest clip as recited in claim 12, wherein the depressions are arcuate in shape.

17. The chest clip as recited in claim 12, wherein each depression has a depth of at least $3/8$ of an inch.

18. The chest clip as recited in claim 12, wherein the one of the engagement members includes a surface having a web site address disposed thereon.

* * * * *

UNITED STATES PATENT AND TRADEMARK OFFICE
CERTIFICATE OF CORRECTION

PATENT NO. : 7,426,771 B2  Page 1 of 1
APPLICATION NO. : 11/820599
DATED : September 23, 2008
INVENTOR(S) : Patrizi et al.

It is certified that error appears in the above-identified patent and that said Letters Patent is hereby corrected as shown below:

Column 7
claim 10, line 43, please delete "carded" and replace with -- carried --

Signed and Sealed this

Twenty-fifth Day of November, 2008

JON W. DUDAS
*Director of the United States Patent and Trademark Office*